(12) United States Patent
Iengo et al.

(10) Patent No.: US 7,534,323 B2
(45) Date of Patent: May 19, 2009

(54) USE FOR THE OLEO-REPELLENT PAPER SIZING OF CARBOXYLIC PERFLUOROPOLYETHERS

(75) Inventors: Paolo Iengo, Milan (IT); Piero Gavezotti, Milan (IT)

(73) Assignee: Solvay Solexis, S.p.A., Milan (IT)

( * ) Notice: Subject to any disclaimer, the term of this patent is extended or adjusted under 35 U.S.C. 154(b) by 391 days.

(21) Appl. No.: 10/858,199

(22) Filed: Jun. 2, 2004

(65) Prior Publication Data
US 2005/0000668 A1    Jan. 6, 2005

(30) Foreign Application Priority Data
Jun. 3, 2003    (IT) .......................... MI2003A1105

(51) Int. Cl.
*D21H 17/11* (2006.01)
*D21H 21/16* (2006.01)

(52) U.S. Cl. ..................... 162/164.1; 162/135; 162/158; 162/183; 162/184; 526/250; 526/253; 570/126; 570/136

(58) Field of Classification Search .................. 162/135, 162/158, 164.1, 183, 184; 526/250, 253; 570/126, 136
See application file for complete search history.

(56) References Cited

U.S. PATENT DOCUMENTS

| | | | |
|---|---|---|---|
| 3,492,374 A | | 1/1970 | Le Bleu et al. |
| 3,665,041 A | | 5/1972 | Sianesi et al. |
| 4,746,550 A | * | 5/1988 | Strepparola et al. ...... 427/385.5 |
| 4,861,836 A | * | 8/1989 | Tatemoto et al. ............ 525/276 |
| 5,211,861 A | * | 5/1993 | Lafratta et al. .............. 508/509 |
| 6,803,109 B2 | * | 10/2004 | Qiu et al. .................. 428/423.1 |
| 6,833,418 B2 | * | 12/2004 | Tan et al. .................... 526/247 |
| 2002/0090536 A1 | * | 7/2002 | Dai et al. ............... 428/694 TF |
| 2003/0139521 A1 | * | 7/2003 | Linert et al. ................ 524/507 |

FOREIGN PATENT DOCUMENTS

| EP | 0 148 482 A2 | 7/1985 |
|---|---|---|
| EP | 0 687 533 A1 | 12/1995 |
| EP | 1 006 168 A1 | 6/2000 |
| EP | 1 273 704 A1 | 1/2003 |
| EP | 1 327 649 A2 | 7/2003 |
| EP | 1 371 676 A1 | 12/2003 |
| WO | WO 97/17381 | * 5/1997 |

OTHER PUBLICATIONS

R.E. Banks, "Organofluorine Surfactants and Textile Chemicals," 1979, Chapter 11, pp. 230-234.
R. M. Chad et al., "Fluorochemical Sizing," *The Sizing of Paper*, TAPPI Press, 1989, pp. 87-101.
E. Deisenroth et al., "The Designing of a New Grease Repellent Fluorochemical for the Paper Industry," *Surface Coatings International 1998* (9), pp. 440-447.
Richard D. Howells, Sr., "Sizing With Fluorochemicals," *1997 TAPPI Sizing Short Course*, Apr. 14-16, 1997, pages: cover, 1-13.

* cited by examiner

*Primary Examiner*—Steven P Griffin
*Assistant Examiner*—Dennis Cordray
(74) *Attorney, Agent, or Firm*—Arent Fox LLP

(57) ABSTRACT

Use for the oleo-repellent paper sizing of carboxylic perfluoropolyethers of formula $$T-O-R_f-T \quad (I)$$

wherein $T=-CF_2-COOH$ or $-CF_2CF_2-COOH$ and $R_f$ is a (per)fluoropolyoxyalkylene chain.

12 Claims, No Drawings

USE FOR THE OLEO-REPELLENT PAPER SIZING OF CARBOXYLIC PERFLUOROPOLYETHERS

The present invention relates to the use of perfluoropolyethers having carboxylic end groups for the oleo-repellent paper sizing.

The oleo-repellent paper and paper products are largely used in packaging of fats, as butter or margarine, of products as coffee and chocolate, and foods having a high fat content as meats, chips, hamburgers, popcorns, food to be cooked in microwave oven, crisps for cats or dogs and in general pet food.

The oleo-repellence is generally evaluated with the Kit Test (TAPPI 557 method) in terms of resistance of the paper sized with hydrocarbon or hydrocarbon mixtures drops having a progressively decreasing surface tension. The oleo-repellence values obtained with the kit Test are however an index of the only additive surface activity and often they have a poor correlation with the real performance in terms of paper protective barrier to oils and fats, both in normal utilization conditions where there is a prolonged contact time at room temperature of the food with the paper package, and in more severe temperature and working conditions as, for example, in the paper package heating in ovens, the contact with hot food and the mechanical stresses due to the creasing system to obtain packages and to the stresses during their use causing creases where the package oleo-repellence results decreased or compromised.

It has been found that a high Kit test value not always is significant to evaluate the oleo-repellence in paper use practical conditions. On this ground users of antigrease paper utilise a series of more severe performance tests and more indicative than the Kit test of the practical behaviour of resistance to fats and oils.

The most commonly used tests by the end-users are the following:
Ralston® Purina Creased Test (RP-2 creased test);
Oleic acid test;
Eukanuba test;
Turpentine Test (TAPPI T-441-om);
Fat acid test.

See the detailed description reported in the Examples.

For the oleo-repellent paper sizing it is known the use of phosphates having segments of perfluoroalkyl type, ("Organofluorine Chemicals and Industrial Applications", pages 231-232, Banks, R. E. Edition, 1979), the use of phosphates and carboxylates having segments of perfluoroalkyl type and thioether bonds (Howells R. D., "Sizing with Fluoro-chemicals", TAPPI Sizing Short Course, Apr. 14-16, 1997, Atlanta; Deisenroth E. et al., The Designing of a new grease repellent fluorochemical for the paper industry, Surface Coating International (9), page 440, 1998) and the use of polymers having perfluoroalkyl segments (Chad R. M. et al., "The Sizing of Paper", 2nd edition, TAPPI PRESS, pages 87-90, (1989), Reynolds Ed.), with which good Kit Test results but not always good results with the above described more severe tests commonly used by the end-users, are obtained.

Compounds capable to satisfy the above tests, as oleic acid test and Ralston test are known. See for example European patent application No. 02.014.155 describing aqueous polyurethane compositions containing perfluoropolyether structures and the use thereof in the oleo-repellent paper sizing. Said polyurethanes capable to confer oleo-repellence to the paper and to satisfy the above tests are generally used either in the wet-end treatment of the cellulose pulp or in the surface treatment of the size-press, preferably in wet-end since better performances are obtained. However the paper to satisfy the above tests requires high amounts of said polyurethanes.

Also other compounds satisfying the above tests are known, as the oleic acid test and the Ralston test, based on phosphoric esters containing perfluoropolyether chains for the wet-end treatment and for the size press treatment. However the two kinds of treatment require different formulations. Furthermore the amount applied to obtain good oleo-repellence performances is high. See for example European patent applications EP 03000384, EP 03000385.

The wet-end treatment of the fluorinated product to the paper is, among the various possible methods, the one generally giving the best oleo-repellence properties, since in this case every single cellulose fiber results treated with the fluorinated product. The external sizing of the fluorinated product is generally limited to a paper surface layer with the consequent possibility that the oleo-repellence can be reduced by creases or by calendering processes, which modify the paper surface layers and make possible the oil penetration. The most known surface treatment method is that requiring the oleo-repellent product application by impregnation by size-press.

In the wet-end application wherein the oleo-repellent compound is added to a very diluted cellulose fiber suspension (0.2-3% by weight) it is important to obtain an efficient product retention on the fibers. The retention is defined as the ratio between the amount of the oleo-repellent compound remaining bound to the paper and the amount of product fed to the cellulose fiber suspension. A poor retention means that a part of the product is lost in the filtering waters after the paper sheet formation. A high compound retention was therefore desired since the known compounds containing perfluoroalkyl segments conferring oleo-repellence were very expensive.

The need was therefore felt to have available compounds for the oleo-repellent paper sizing having the following combination of properties:
- to be able to confer to the paper an oleo-repellence capable to pass the most severe performance tests used by the end-users for mass (wet-end) and surface applications (those above mentioned).
- to have a high retention in wet-end treatment with consequent poor or no loss of product.

The Applicant has surprisingly and unexpectedly found compounds capable to satisfy the above requirements.

An object of the present invention is the use for the oleo-repellent paper sizing of perfluoropolyethers having the following structure:

$$T-O-R_f-T \qquad (I)$$

wherein
$T=-CF_2-COOH$ or $-CF_2CF_2-COOH$;
$R_f$ is a (per)fluoropolyoxyalkylene chain, having number average molecular weight in the range 500-10,000, formed of one or more repeating units, statistically distributed along the chain, having the following structure:

$(CFXO), (CF_2CF_2O), (CF_2CF_2CF_2O),$
$(CF_2CF_2CF_2CF_2O), (CR_4R_5CF_2CF_2O), (CF(CF_3)CF_2O), (CF_2CF(CF_3)O),$ wherein $X=F, CF_3$; $R_4$ and $R_5$, equal to or different from each other, are selected among H, Cl, or perfluoroalkyl from 1 to 4 carbon atoms.

In particular the following fluoropolyether $R_f$ can be mentioned as preferred:

(A) —$(CF_2CF(CF_3)O)_a(CFYO)_b$— wherein Y is F or $CF_3$; a and b are integers such that the molecular weight is within the above range; a/b is between 10 and 100;

or the repeating units indicated in (A) can be linked as follows:

wherein $R'_f$ is a fluoroalkylene group from 1 to 4 C atoms;

(B) —$(CF_2CF_2O)_c(CF_2O)_d(CF_2(CF_2)_zO)_h$— wherein c, d and h are integers such that the molecular weight is within the above range, h can also be equal to 0; c/d is between 0.1 and 10; h/(c+d) is between 0 and 0.05; z is 2 or 3;

(C) —$(CF_2CF(CF_3)O)_e(CF_2CF_2O)_f(CFYO)_g$— wherein Y is F or $CF_3$; e, f, g are integers such that the molecular weight is within the above range; e/(f+g) is between 0.1 and 10, f/g is between 2 and 10;

(D) —$(CF_2(CF_2)_zO)_s$— wherein s is an integer such to give the above molecular weight, z has the already defined meaning;

(E) —$(CR_4R_5CF_2CF_2O)_{j'}$— wherein $R_4$ and $R_5$ are equal to or different from each other and selected from H, Cl or perfluoroalkyl, for example having 1-4 C atoms, j' being an integer such that the molecular weight be that above indicated; said units inside the fluoropolyoxyalkylene chain can be linked with each other as follows:

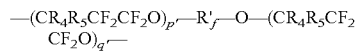

wherein $R'_f$ is a fluoroalkylene group, for example from 1 to 4 C atoms; p' and q' are integers such that the molecular weight be that above mentioned;

(F) —$(CF(CF_3)CF_2O)_{j''}$—$(R'_f)$—O—$(CF(CF_3)CF_2O)_{j''}$ j'' being an integer such to give the above molecular weight, $R'_f$ is a fluoroalkylene group from 1 to 4 C atoms.

Examples of compounds comprised in formula (I) have the following formulas:

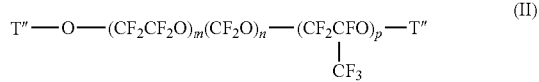

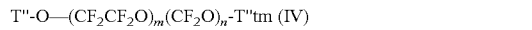

wherein T''=—$CF_2$—COOH, T'=—$CF_2CF_2$—COOH; the m, n, q indexes ar integers, p is an integer, the indexes being such that the number average molecular weight is in the range 500-10,000, preferably 1,000-4,000; in structure (II) the m/n and p/m ratios are between 0.5 and 5; in structure (IV) the m/n ratio is between 0.1 and 10.

The preferred compounds are those having the structure (IV).

The compounds of formula (I) and in particular those of formula (II), (III) and (IV) are known. They can be prepared, for example, by photooxidation of fluoroolefins according to U.S. Pat. No. 3,665,041, or according to EP 148 482 describing also the preparation of those of structure (III).

The processes described in the above patents lead to structures having —COF end groups, then converted into carboxylic acids by hydrolysis with water at the temperature of 40° C.-80° C.

These perfluoropolyether carboxylic derivatives are preferably used in the oleo-repellent paper sizing under the form of salts solubilized or emulsified in water or in mixtures of water with alcohols, glycols, ethers. As alcohols, isopropanol, ethanol, methanol, t-butanol can be used; as ether the dipropylenglycol monomethylether can be used while as glycols the ethylene or propylene glycol can be used.

The salts are obtained by neutralization of said acids with organic bases, as for example NaOH, KOH, $NH_4OH$, and organic bases $R_1(R_2)(R_3)N$ type, wherein $R_1=R_2$=alkyl or hydroxyalkyl, $R_3$=H, alkyl or hydroxyalkyl, as for example methyl amine, diethyl amine, triethyl amine, ethanolamine, diethanolamine, triethanolamine, morpholine.

A further object of the present invention are aqueous compositions comprising:

A) from 1 to 60% by weight, preferably from 15 to 25% by weight of a compound of formula (I) in a salified form and optionally B) from 0.5 to 25% by weight, preferably from 1 to 5% by weight of a solvent selected from alcohols, glycols, ethers, preferably selected among isopropanol, ethanol, methanol, t-butanol, dipropylenglycol monomethylether, ethylene glycol, propylene glycol; and C) water as complement to 100.

The salt cations are selected from alkaline metals, ammonium, and primary, secondary or tertiary amines in protonated form.

Said compositions are chemically and physically stable in a temperature range from 0° C. to 60° C., whereby they are storable for a long period of time. An occasional freezing of the compositions is reversible. This represents and advantage of the invention compositions.

The invention compositions can be used for oleo-repellent paper sizings, after water dilution, in wet-end applications, surface sizing or coating applications.

The size-press process consists in the paper surface sizing to confer oleo-repellence thereto by a roll system (size-press) applying the treating composition on both sides of the preformed paper.

The wet-end process consists in the paper sizing in mass with the invention compositions starting from a cellulose slurry in water. The slurry can be formed or of virgin, soft or hard wood, treated with sulphate and/or sulphite process, suitably refined, or of recycled cellulose slurries or also by mixtures of said two kinds of slurries. The dry cellulose concentration in the slurry ranges from 0.1% to 10% by weight. The pulp-slurry can contain the additives normally used in the paper industry, for example organic or inorganic fillers, as talc, kaolin, calcium carbonate or titanium dioxide; coadiuvant agents as starches, dextrins, retention agents, flocculating agents, buffer systems, fungicides, biocides, sequestrants, glue agents as ASA (alkenyl succinic anydride) or AKD (alkyl ketene dimer). The cellulose suspension can have both acid and basic pH, preferably basic.

Normally the invention compositions are added to the cellulose aqueous slurry in an amount such to obtain paper having a content of acid of formula (I) or its salt ranging from 0.05% to 2% by weight with respect to the weight of the dry cellulose.

To improve the product retention on the cellulose fibers, it is preferable to add to the paper slurry a fixative or retentive agent. Said fixative agent is generally a cationic compound, generally of polymeric nature, having a molecular weight ranging from 10,000 to 5,000,000, in an amount ranging from 0.01% to 1% by weight of cationic compound based on the dry cellulose. The fixative agents are for example the following: cationic polyacrylamides, polyamines, polyamidoamine-epichlorohydrin or dimethylamine-epichlorohydrin copolymers, polyethylenimines, polydiallyl-dimethyl-ammonium chloride. To the pulp slurry chelants can be added to moderate the water hardness.

After the addition of the invention composition to the cellulose slurry, the water is removed obtaining a wet paper which is dried, for example, at temperatures in the range 90° C.-130° C., according to the standard procedures used in the paper industry.

In a typical application by coating, the compound of formula (I) is added in an amount ranging from 0.2 to 3% by weight to a coating suspension containing, for example, mineral compounds as calcium carbonate, kaolin, titanium dioxide and binders for pigments based on styrene-butadiene copolymers, acrylic copolymers or copolymers containing vinyl acetate.

It has been found that the compounds of formula (I) besides conferring oleo-repellence to paper, confer thereto also anti-adhesiveness properties, favouring, for example, the release of the paper sheets wound on webs.

The following Examples illustrate the invention without limiting the scope thereof.

EXAMPLES

Oleo-repellence Evaluation

The oleo-repellence evaluation has been carried out by the following tests:

Kit Test

This test is also known as TAPPI 557 method. The solutions indicated in Table 1 having decreasing values of surface tension have been prepared according to the Kit test.

TABLE 1

| Solution No. | Castor oil % vol. | Toluene % vol. | n-Heptane % vol. |
|---|---|---|---|
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |

A paper sized specimen is placed on a flat and clean, black-coloured surface. One starts from the solution No. 12. A drop of the test solution is let fall on the paper from a height of 25 mm. The drop is left in contact with the paper for 15 seconds, removing it then by clean blotting paper and the surface under the drop is examined. When the surface has become dark the specimen does not pass the test. The test is repeated with the solution No. 11. If the tested specimen does not pass the test, one continues using the solution No. 10 and then the others in a decreasing number order, until the solution which does not cause the darkening of the underlying surface is found. The number of this solution is the Kit Test value assigned to the paper.

The Kit Test is widely used for the immediate evaluation of the oleo-repellence properties of the papers sized with fluorinated compounds, since it is capable to give in very short times (about 20 seconds) an estimation of the paper antigrease properties.

However the evaluations given by this test are not always reliable. For example, papers sized having a high Kit Test value can show under particular conditions a poor barrier power towards some fats, for example at temperatures higher than the room temperature or with particularly aggressive fat mixtures.

The reason is based on the fact that the Kit Test solutions discriminate the various levels of antigrease treatment and therefore assign the respective KIT test values essentially in function of the surface tension.

Furthermore, in said method, mixtures of castor oil, toluene and heptane are used, compounds which, especially the last two, are never present in any fat or oil with which the paper sized comes normally into contact.

In addition, it results that the capability of penetration of the animal or vegetable fats does not only depend on the surface tension but also, for example, on the presence of reactive groups, for example the carboxylic group.

For said reasons the following performance tests are used, which simulate more realistic use conditions as regards the fat type, the contac time and the utilization temperature of the antigrease paper.

RP-2 Crease Test (Ralston Crease Test)

The reactants and the instruments necessary for this test are available by Ralston Purina® Company. The Ralstone Crease Test (RP-2 test) is commonly used to evaluate the resistance properties to the oil penentration in antigrease papers for pet-food packaging. The specimen to be tested is conditioned for 24 h at 23° C. and 50±2% of relative humidity. A piece having 10 cm×10 cm sizes is cut out. The cutting is positioned over a flat, smooth and stiff surface, placed over a coated paper sheet on which a grid of 100 small squares is printed, having a surface exactly equal to that of the specimen to be tested. Before being positioned on the grid, the specimen is slightly creased along a diagonal. The crease is then reinforced with a suitable roll having a weight of 2040±45 g, diameter of 9.5 cm and width of 4.5 cm, covered by a rubber layer of controlled hardness having a thickness of 0.6 cm. The roll speed during the creasing must be 2-3 cm/sec. The specimen is to be creased along both diagonals, the second crease is made by creasing the paper on the opposite side. The specimen with the creases is transferred on the grid so that it perfectly covers the grid surface. A metal ring having a diameter of 7.5 cm is placed on the paper specimen to be tested. A metal pipe (height=2.5 cm, internal diameter 2.5 cm) is placed in the middle of the specimen, then 5 g of sand (Ottawa sand, 20-30 mesh) are poured into the pipe. The pipe is then removed so as to form a sand cone in the middle of the specimen. Then 1.3 cc of a specific synthetic oil supplied by Ralston Purina which contains 0.1% by weight of a red organic dye are added to the sand cone by a syringe. In accordance with what stated by Ralston-Purina Company, this oil is a mixture of glycerol trioleate and free oleic acid and therefore it fairly well simulates the composition of a food fat.

Usually for the test at least 4 specimens of the same paper sample are prepared. The specimens with the sand are then kept in a stove at 60° C. and 50±2% of relative humidity for 24 hours.

At the end, the paper specimens with the sand are removed and the underlying grid surface stained by the coloured oil is evaluated. Each stained small square represents a fraction of the specimen surface equal to 1%. The final value is the average of the results obtained on at least 4 specimens of the same sample. The Ralston Crease Test (RP-2 test) result is then expressed as number of stained small squares, which expresses also the % of the stained squares of the grid. The sample acceptability limit is 2% of the stained surface of the grid.

C) Resistance Test to Oleic Acid

The resistance test to oleic acid evaluates the capability of the paper sized with oleo-repellent additives to resist the hot penetration of the oleic acid. This test is very significant to check the presence of high oleo-repellence performances under realistic conditions, since the oleic acid is the most diffused fat acid, by percentage, among those constituting animal and vegetable oils. It is known that fats of vegetable or animal nature are formed of triglycerides, i.e. by glycerine esters of fat acids. The triglyceride penetrating power in the antigrease paper sized is lower than that shown by the single free fat acids.

The oleic acid is absolutely the most abundant among the acids composing the triglycerides. Furthermore all the fats and oils contain variable amounts, in the range 0.1-5%, of free fat acids which can increase owing to triglyceride hydrolysis processes due to the conditions of their use as for example high temperatures in cooking processes and the presence of basic environments.

The oleic acid has therefore been selected as representative of fat acids capable to penetrate the antigrease paper sized.

For the test execution, a paper sized specimen is taken, a square surface of about 10×10 cm is cut out and put in a stove at 60° C. Then 20 drops of pure oleic acid are placed on the specimen. The specimen with the oleic acid drops is left in the stove at 60° C. for 2 hours. This time elapsed, the oleic acid drops are removed with blotting paper and the specimen is placed on a dark surface. The penetration of the oleic acid in the paper is shown by the darkening of the zones underlying the drops. The test is considered positive (i.e. the resistance to the oleic acid is ascertained) if no darkening in any of the examined zones is verified. On the contrary, the test is considered negative and the tested specimen does not show resistance to oleic acid.

Eukanuba Test

This test is particularly useful to verify the antigrease paper suitability for the pet-food packaging. Briefly, this test implies the contact in standardized conditions of the pet-food with the paper specimen to be tested. To standardize the test, the pet-food with the trademark Eukanuba® is used, which can be easily found both in Europe and in the United States. This material is characterized in that the average fat content is equal to at least 14% by weight. The Eukanuba pet-food is finely milled in a mortar. An antigrease paper specimen, having 10×10 cm sizes, is cut out to be tested. This specimen is creased in a standardized way along the diagonals, likewise as made in the RP-2 test, and placed on a squared paper specimen having the same characteristics as that used in the Ralston Purina creased test. A metal ring having an internal diameter equal to 7.2 cm and height equal to 2.5 cm is placed in the middle of the specimen. Then 60 g of milled pet-food are taken, which are homogeneously placed inside the ring on the paper specimen to be tested. A weight equal to 1.5 kg, cylinder-shaped, having lower surface smooth as that of the ring, is then placed on the milled pet-food applied on the paper specimen. The whole is put in a stove at 60° C. and 50% relative humidity for 24 hours. This time elapsed, the weight and the pet-food are removed and the specimen surface is tested to find fat stains, which would witness the occurred fat penetration. The test result is expressed in terms of percentage of stained surface. To have a significant result, the test is carried out on at least 4 specimens subjected to the same treatment and the final result is the average of the 4 tests. The test is considered positive if the stained surface is lower than 2%.

Resistance Test to Trementine (Turpertine Test TAPPI T454 om-00)

5 grams of Ottawa sand (20-30 mesh) are weighed, by a funnel they are placed on the paper sized specimen having about 10×10 cm sizes positioned in its turn on a coated paper white sheet. The funnel must have the stem horizontally cut so that the sand be conically placed on the specimen. On the sand cone top 1.1 ml of coloured trementine (about 1% of red dye) are let drop by graduated pipette. The test time is timed. For the first 5 minutes the paper specimen is moved every minute from the underlying sheet and the possible trementine stains are observed on the white paper sheet which serves as a marker. After the first 5 minutes, this operation is carried out every 3 minutes up to a maximum of 30 minutes (1800 sec).

The test is positive when after 30 minutes no stain on the underlying white sheet is noticed.

Resistance Test to Fat Acids

Five mixtures of free fat acids are prepared starting from the respective pure compounds. The considered mixtures have the following composition:

|  | Mixture A (% by wt) | Mixture B (% by wt) | Mixture C (% by wt) | Mixture D (% by wt) | Mixture E (% by wt) |
|---|---|---|---|---|---|
| Castor oil | 80 | — | — | — | — |
| Oleic Acid C18 | 20 | 75 | 62 | 41 | 9 |
| Linoleic Acid C18 | — | 11 | 4 | 3 | 2 |
| Palmitic Acid C16 | — | 14 | 32 | 38 | 18 |
| Lauric Acid C12 | — | — | 2 | 8 | 56 |
| Capric Acid C10 | — | — | — | 3 | 6 |
| Caprilic Acid C8 | — | — | — | 1 | 8 |
| Caproic Acid C6 | — | — | — | 6 | 1 |

Five vessels containing each the single mixtures of fat acids called A, B, C, D, E are placed in a stove kept at 60° C. at least one half before the test, to guarantee composition and temperature uniformity. Said mixtures, in fact, appear at room temperature as waxy solids having a variable melting point.

Ten specimens having 5×5 cm sizes are then cut out for each specimen to be tested. These specimens are placed in a stove at 60° C., paying attention to place them over a dark surface, for example a black card. On each of them a certain number of drops of the test mixture is then placed. At least two specimens are used for each mixture.

At the end of this operation, the stove is closed and the specimens are left in contact with the fluid drops of the test mixture for 10 minutes. This time elapsed, the stove is opened and the mixture drops are removed by blotting paper. The penetration of the fluid of the test mixture in the paper specimen is shown by the darkening of the area below each drop. For each test mixture, the test is positive if no penetration takes place. The test result is expressed with the letter of the test mixture preceding the first test mixture which penetrates through the specimen.

Tests carried out by the Applicant have shown that the penetration capability of hot fat acids, at temperatures ranging from 40° C. to 60° C., depends on their chemical structure. In particular, in linear fat acids, the penetration capability of hot fat acids on papers sized with oleo-repellent products mainly depends on the hydrocarbon chain length, i.e. on the number of carbon atoms of the fat acid. The lower this number, the lower the necessary time will be in order that, at constant temperature, fat acid drops penetrate the paper sized. The Applicant has furthermore found that, at equal number of carbon atoms, the presence of unsaturations in the structure of a linear fat acid does not substantially modify its penetration capability in paper sized specimens, with respect to the same fat acid free from unsaturations.

These considerations are at the basis of the fat acid test for the evaluation of the antigrease properties. The test implies the contact of the paper sized specimens with oleo-repellent substances with hot fat acid mixtures having a variable composition from A to E, so that the average length of the hydrocarbon chains be decreasing.

The mixture A contains 20% by weight of free fat acid, diluted in 80% by weight of castor oil. It has a low aggressive power and is used to discriminate the low treatment levels, for example those necessary to produce disposable papers for hamburgers, and in general for the fast-food. The papers sized commercially used for the aforesaid uses normally have Kit Test values from 3 to 5.

The compositions of the mixtures B, C, D and E represent respectively the compositions in fat acids of the olive oil, animal lard, butter and coconut oil.

The present test, as regards the times required for its accomplishment, is a valid alternative to the Kit Test and besides evaluates the paper antigrease behaviour in more realistic terms since it uses the fat acids present in the triglycerides contained in the common fats and oils.

Evaluation of the Release Properties of a Paper Support

Test I The evaluation of the release properties of a paper support is carried out by cutting out 10 squares having 10×10 cm sizes of the paper to be tested. The specimens are piled on each other on a stove top, each with the sized side upturned. Then a metal square of the same sizes, which exactly adheres to the specimen surface, is placed thereon, and a weight is placed thereon so that the total weight applied on the paper specimen pile be of 3 kg. The stove is maintained for 15 minutes at 50±1° C. and 50±2% of relative humidity. At the end the weights are removed. The test is passed if the paper specimens are detachable from each other.

Test II

This test allows to quantitatively determine the release effect.

An adhesive tape having 1×5 cm sizes is applied on the paper specimen, on which an uniform pressure is exerted for 5 minutes by an aluminum weight equal to 70 grams. This time elapsed, the weight is removed and the force necessary to detach the adhesive tape from the paper specimen is measured by a dynamometer. For each specimen three measurements are carried out. The measured force is expressed in grams and the value indicated in the Tables represents the average value of the three tests.

Example 1

Preparation of the Compound of Formula (IV) in Salified Form 500 grams of a diacyl fluoride of formula

wherein m/n=2.5 and number average molecular weight equal to 1,500, are mixed with 250 ml of demineralized water and maintained under stirring at 60° C. for 2-4 hours until complete conversion of the COF end groups into COOH, checked by FT-IR spectroscopy. The reaction is complete at the absorption disappearance at 1880-1890 cm$^{-1}$ typical of the COF group. When the reaction is over, the stirring is stopped and the mixture is cooled at room temperature and the phases are let separate for 4 hours, the upper aqueous phase is removed and the fluorinated phase is heated to 100° C. under vacuum (1 torr) to remove the dissolved water.

The product is successively characterized by $^{19}$F-NMR spectroscopy for the determination of the molecular weight, the equivalent weight and to confirm the complete absence of COF end groups.

Then 50 grams of the so obtained dicarboxylic acid are added under stirring to 200 grams of a mixture water/isopropanol 90/10 v/v containing 9 grams of ammonia solution at 30%.

It is left under stirring for one hour at room temperature until complete neutralization of the acid. A limpid emulsion having a pH comprised between 8 and 9 containing 20% by weight of the compound of formula (IV) salified with ammonia, is obtained.

Preparation of Oleo-repellent Paper by Wet-end Treatment

An aqueous slurry of virgin fiber consisting of 50% by weight of maple hard wood and 50% of eucalyptus soft wood is refined at 33°SR (Shopper degrees) and diluted with water until obtaining a slurry containing 0.4% by weight of dry cellulose. To this slurry 0.75% by weight, with respect to the dry wood, of cationic starch (Cato 235, National Starch) previously cooked in aqueous suspension at 5% by weight at 90° C. for 30 minutes, is added.

The emulsion of the salified product of formula (IV), prepared as above, is added to the slurry after dilution with water, in such amounts as to have a cellulose slurry having concentrations of oleo-repellent product respectively of 0.3, 0.4, 0.5 and 0.7% by weight with respect to the dry wood. To the obtained suspension 0.4% by weight with respect to the dry wood of a commercial solution of a cationic coagulant (dimethylamine-epichlorohydrin, Nalco 7607, Nalco Corp.) is then added.

The resulting slurries have a pH of about 7.5 and respectively 0.3, 0.4, 0.5 and 0.7% by weight of oleo-repellent product and are transferred in a laboratory sheetforming machine. In each test the wet paper specimen is recovered and dried in press at 105° C. for 2 minutes. The weight of the obtained paper specimens is equal to 70 g/m$^2$. By analysis of the total fluorine on the paper specimens (ASTM D 3761-84 method) it has been found that they contain respectively 0.3, 0.4, 0.5 and 0.7% by weight of the oleo-repellent product. This shows that essentially all the oleo-repellent compound contained in the treating emulsions has remained on the cellulose fiber and therefore a substantially 100% product retention has taken place.

The specimen oleo-repellence properties, evaluated by the above tests, are reported in the following Table 1.

TABLE 1

Oleo-repellence properties of paper sized specimens in wet-end with the product of the present invention

| % by weight on dry fiber | Kit Test | RP-2 Creased Test (% stained surface) | Oleic Acid Test | Eukanuba Test (% stained surface) | Turpentine Test (secs) | Fat Acid Test |
|---|---|---|---|---|---|---|
| 0.3 | 7 | 0 | positive | 1.5 | 1800+ | E |
| 0.4 | 8 | 0 | positive | 0 | 1800+ | E |
| 0.5 | 9 | 0 | positive | 0 | 1800+ | E |
| 0.7 | 10 | 0 | positive | 0 | 1800+ | E |

The obtained paper passes all the oleo-repellence tests even at very low dosages of the fluorinated compound.

Examples 2-7 (Comparative)

Preparation of Oleo-repellent Paper by Wet-end Treatment Using Commercial Products Example 1 has been repeated but adding to the pulp slurry, instead of the salified product of formula (IV), respectively the following commercial oleo-repellent products in such amounts to have in the final dried paper specimen 0.3% of product calculated on the dry fiber:

2) AG530N® (Asahi Glass), formed of an aqueous dispersion of diethanolamine salts of perfluoroalkylethylphosphates;
3) Lodyne P-201® (Ciba), formed of an aqueous dispersion of ammonium salt of perfluoroalkylcarboxylate containing a thioether bond;
4) Zonyl 8868® (DuPont), formed of an aqueous dispersion of a cationic acrylic copolymer containing perfluoroalkyl segments;
5) Lodyne 2000® (Ciba), formed of an aqeuous dispersion of an aminoacidic derivative containing perfluoroalkyl segments;
6) Foraperle 325® (Atofina), formed of an aqueous disperion of a cationic acrylic copolymer having perfluoroalkyl segments;
7) FC-807A® (3M), formed of an aqeuous dispersion of ammonium salt of bis(N-ethyl-2-perfluoroalkylsulphonamido ethyl)phosphate, mixture of phosphor monoester and di-ester, wherein the di-ester is not higher than 15% by weight.

The oleo-repellent properties of the paper sized specimens as in the Examples from 2 to 7 are indicated in Table 2 in comparison with those of the Example 1.

TABLE 2

Comparison of the oleo-repellence properties of paper specimens obtained by wet-end treatment

| Example No. | Kit Test | RP-2 Creased Test (% stained surface) | Oleic Acid Test | Eukanuba Test (% stained surface) | Turpentine Test (sec) | Fat Acid Test |
|---|---|---|---|---|---|---|
| 1 | 7 | 0 | Positive | 1.5 | 1800+ | E |
| 2 (comp) AG530N ® | 8 | 20 | Negative | >10 | <900 | B |
| 3 (comp) Lodyne P-201 ® | 5 | 4 | Negative | >10 | <600 | A |
| 4 (comp) Zonyl 8868 ® | 8 | 30 | Negative | >5 | <900 | B |
| 5 (comp) Lodyne 2000 ® | 7 | 0 | Negative | >5 | 1800+ | C |
| 6 (comp) Foraperle 325 ® | 8 | 0 | Positive | 2.0 | 1800+ | C |
| 7 (comp) FC-807A ® | 7 | 0 | Negative | <10 | 1800+ | C |

Example 8

Preparation of Oleo-repellent Paper by Size-press Treatment

A paper support having a paper weight of 65 g/m² is formed in a laboratory sheetforming machine by using a slurry of cellulose virgin wood formed of 70% by weight of maple hard wood and 30% by weight of eucalyptus soft wood to which 0.2% by weight with respect to the dry fiber of cationic coagulant formed of a dimethylamine-epichlorohydrin copolymer has been added. The wet paper sheets are partially dried in a thermoventilated stove until obtaining a wetness of approximately 20% by weight.

The obtained paper sheets are treated in a size-press equipment, at room temperature, at a pressure among the cylinders of 3 bar (3·10⁵ Pa) with an aqueous dispersion containing 4% by weight of non ionic starch (C Star Film TCF 07324, Cerestar), previously cooked at 90° C. for 30 minutes, to which the salified product of formula (IV) of the Example 1 has been added, at concentrations of 0.4, 0.5 and 0.6% by weight, so as to obtain paper sheets which after drying in press at 105° C. for 3 minutes, show a content of the salified product (IV) respectively of 0.4, 0.5 and 0.6% by weight with respect to the dry wood. The properties of the obtained sheets are described in the following Table 3.

TABLE 3

Oleo-repellence properties of paper sized specimens
in size-press with the product of the present invention

| % by weight on dry fiber | Kit Test | RP-2 Creased Test (% stained surface) | Oleic Acid Test | Eukanuba Test (% stained surface) | Turpentine Test (sec) | Fat Acid Test |
|---|---|---|---|---|---|---|
| 0.4 | 8 | 0 | Positive | 0 | 1800+ | D |
| 0.5 | 9 | 0 | Positive | 0 | 1800+ | D |
| 0.6 | 10 | 0 | positive | 0 | 1800+ | E |

Examples 9-14 (Comparative)

Preparation of Oleo-repellent Paper by Size-press Treatment by Using Commercial Products Example 8 has been repeated but the paper sheets are treated in a size-press equipment, instead of the salified product of formula (IV), respectively with the following commercial oleo-repellent products in such amounts to have 0.4% by weight of product with respect to the dry wood:

9) AG530N® (Asahi Glass), formed of an aqueous dispersion of diethanolamine salts of perfluoroalkylethylphosphates;
10) Lodyne P-201® (Ciba), formed of a carboxylate salt of a perfluoroalkyl-based compound, containing a thioether bond;
11) Zonyl 8868® (DuPont), formed of an aqueous dispersion of a cationic acrylic copolymer containing perfluoroalkyl segments;
12) Lodyne 2000® (Ciba), formed of an aqueous dispersion of an aminoacidic derivative containing perfluoroalkyl segments;
13) Foraperle 325® (Atofina), formed of an aqueous dispersion of a cationic acrylic copolymer having perfluoroalkyl segments;
14) FC-807A® (3M), formed of an aqeuous dispersion of ammonium salt of bis(N-ethyl-2-perfluoroalkylsulphonamido ethyl)phosphate, mixture of phosphor monoester and di-ester, wherein the di-ester is not higher than 15% by weight.

The oleo-repellent properties of the paper sized specimens as in the Examples from 9 to 14 are reported in Table 4 in comparison with those of the Example 8.

TABLE 4

Comparison of the oleo-repellence properties of the paper obtained by treatment in size-press

| Example No. | Kit Test | RP-2 Creased Test (% stained surface) | Oleic Acid Test | Eukanuba Test (% stained surface) | Turpentine Test (sec) | Fat Acid Test |
|---|---|---|---|---|---|---|
| 8 | 8 | 0 | Positive | 0 | 1800+ | D |
| 9 (comp) AG530N® | 10 | 20 | Negative | >10 | 1800+ | A |
| 10 (comp) Lodyne P-201® | 12 | 0 | Negative | >10 | 1800+ | A |
| 11 (comp) Zonyl 8868® | 12 | 0 | Negative | >10 | 1800+ | A |
| 12 (comp) Lodyne 2000® | 12 | 0 | Negative | >5 | 1800+ | B |
| 13 (comp) Foraperle 325® | 12 | 0 | Positive | 0 | 1800+ | C |
| 14 (comp) FC-807A® | 12 | 0 | Negative | >5 | 1800+ | A |

Examples 15-16 (Comparative)

Preparation of Oleo-repellent Paper by Wet-end Treatment by Using Commercial Products Example 1 has been repeated, but by adding to the pulp slurry instead of the salified product of formula (IV), respectively the following commercial oleo-repellent products in such amounts to have in the slurry 0.5% of product calculated on the dry wood:

15) Fluorolink PT5045® (Solvay Solexis), formed of an aqueous dispersion of ammonium salt of a perfluoropolyether ethoxy-phosphate;
16) Fluorolink PT5060® (Solvay Solexis), formed of an aqueous dispersion of a polyurethane having perfluoropolyether segments and carboxylic functional groups neutralized with triethylamine.

The oleo-repellent properties of the paper sized specimens as in the Examples 15, 16 are indicated in Table 5 in comparison with those of the Example 1.

The results show that the product of the present invention is able to confer a higher resistance to hot fat acids.

TABLE 5

Comparison of the oleo-repellence properties of paper specimens obtained by wet-end treatment

| Example No. | Kit Test | RP-2 Creased Test (% stained surface) | Oleic Acid Test | Eukanuba Test (% stained surface) | Turpentine Test (sec) | Fat Acid Test |
|---|---|---|---|---|---|---|
| 1 | 9 | 0 | Positive | 0 | 1800+ | E |
| 15 (comp) Fluorolink PT5045 ® | 7 | 0 | Positive | 0 | 1800+ | C |
| 16 (comp) Fluorolink PT5060 ® | 7 | 0 | Negative | 0 | 1800+ | B |

Example 17

Card Size-press Treatment by Coating with a Formulation Containing the Salified Product of Formula (IV) of the Ex. 1

A specimen of coupled card, having a paper weight of 280 g/m², is coated by a laboratory film-spreader with a formulation at 65% by weight of total solids having the following composition:
lamellar kaolin 41.2%;
titanium dioxide 10%;
styrene-butadiene latex 13%;
1.0% of product of the Example 1.

The coating temperature during the application is 50° C., the coated layer thickness is 1.2 mil (about 30 nm). The wet coated card is dried in stove at 110° C. for 2 minutes. The obtained specimen has an oleo-repellence value, determined according to Kit Test, equal to 7.

Example 18

Preparation of Paper Having Oleo-repellent and Release Properties Externally Sized with a Formulation Containing a Thermowelding Polymer and the Salified Product of Formula (IV) of the Example 1.

An aqueous formulation containing 49% by weight of a thermowelding acrylic polymer (Crodacoat® 59-598, Croda) is additioned with 2% by weight, with respect to the acrylic polymer weight, of the salified product of formula (IV) of the Example 1. It is diluted then with water until obtaining a dispersion at 25% by weight of solids. Paper specimens having a paper weight equal to 65 g/m² are coated with the above prepared dispersion using a laboratory film-spreader and then dried at 105° C. for 3 minutes. In this way about 5 g/m² of the solids contained in the dispersion are applied on the paper.

The properties of the coated paper sheets are the following:
Release properties:
  Test I: positive
  Test II: release force: 0.8 g
Oleo-repellent properties:
  Kit Test: 10

Example 19 (Comparative)

Example 18 is repeated without adding the salified product of formula (IV) of the Example 1. The properties of the so obtained coated paper sheets are the following:
Release properties:
  Test I: negative
  Test II: release force: 160 g
Oleo-repellent properties:
  Kit Test: 1

The invention claimed is:

1. A method of conferring to paper oleorepellence, comprising sizing the paper in wet-end, size-press or coating applications with perfluoropolyethers, wherein said perfluoropolyethers are only selected from compounds having the following structure:

T—O—R$_f$—T    (I)

wherein
T=—CF$_2$—COOH or —CF$_2$CF$_2$—COOH, in acid or salt form;
R$_f$ is a (per)fluoropolyoxyalkylene chain, having number average molecular weight in the range 500-10,000, formed of one or more repeating units, statistically distributed along the chain, selected from the group consisting of the following structures:

(CFXO), (CF$_2$CF$_2$O), (CF$_2$CF$_2$CF$_2$O), (CF$_2$CF$_2$CF$_2$CF$_2$O), (CR$_4$R$_5$CF$_2$CF$_2$O), (CF(CF$_3$)CF$_2$O), and (CF$_2$CF(CF$_3$)O), wherein X=F, CF$_3$; R$_4$ and R$_5$, equal to or different from each other, are selected from the group consisting of H, Cl, or perfluoroalkyl from 1 to 4 carbon atoms.

2. The method according to claim 1, wherein R$_f$ is selected from
(A) —(CF$_2$CF(CF$_3$)O)$_a$(CFYO)$_b$—
  wherein Y is F or CF$_3$; a and b are integers such that the molecular weight is within the above range;
  a/b is between 10 and 100;
  or the repeating units indicated in (A) can be linked as follows:

—(CF$_2$CF(CF$_3$)O)$_a$(CFYO)$_b$—CF$_2$(R'$_f$)CF$_2$—O—(CF$_2$CF(CF$_3$)O)$_a$(CFYO)$_b$— wherein R'$_f$ is a fluoroalkylene group from 1 to 4 C atoms;
(B) —(CF$_2$CF$_2$O)$_c$(CF$_2$O)$_d$(CF$_2$(CF$_2$)$_z$O)$_h$—
  wherein c, d and h are integers such that the molecular weight is within the above range, h can be equal to 0; c/d is between 0.1 and 10; h/(c+d) is between 0 and 0.05; z is 2 or 3;
(C) —(CF$_2$CF(CF$_3$)O)$_e$(CF$_2$CF$_2$O)$_f$(CFYO)$_g$—
  wherein Y is F or CF$_3$; e, f, g are integers such that the molecular weight is within the above range;
  e/(f+g) is between 0.1 and 10, f/g is between 2 and 10;
(D) —(CF$_2$(CF$_2$)$_z$O)$_s$—
  wherein s is an integer such to give the above molecular weight, z has the already defined meaning;
(E) —(CR$_4$R$_5$CF$_2$CF$_2$O)$_{j'}$—
  wherein R$_4$ and R$_5$ are equal to or different from each other and selected from the group consisting of H, Cl or perfluoroalkyl, j' being an integer such that the molecular weight is that above indicated; said units inside the fluoropolyoxyalkylene chain can be linked with each other as follows:

$$-(CR_4R_5CF_2CF_2O)_{p'}-R'_f-O-(CF_4R_5CF_2CF_2O)_{q'}-$$

wherein $R'_f$ is a fluoroalkylene group; p' and q' are integers such that the molecular weight is that above mentioned;

(F) $-(CF(CF_3)CF_2O)_{j''}-(R'_f)-O-(CF(CF_3)CF_2O)_{j''}$ wherein j" is an integer such as to give the above molecular weight, $R'_f$ is a fluoroalkylene group from 2 to 4 C atoms.

3. The method according to claim 2, wherein the perfluoropolyether has formula:

$$T''-O-(CF_2CF_2O)_m(CF_2O)_n-T''$$

wherein $T''=-CF_2-COOH$, and the m, n, indexes are integers, such that the number average molecular weight is in the range 500-10,000, and the m/n ratio is between 0.1 and 10.

4. The method according to claim 1, wherein the compounds of formula (I) are used in the form of salts solubilized or emulsified in water or in mixtures of water with alcohols, glycols, or ethers, wherein the alcohols are selected from isopropanol, ethanol, methanol, and t-butanol; the ether is dipropylenglycol monomethylether; the glycols are selected from ethylene glycol and propylene glycol.

5. The method according to claim 2, wherein $R_4$ and/or $R_5$ are perfluoroalkyls having 1 to 4 C atoms.

6. The method according to claim 2, wherein when $R_f$ is $-(CR_4R_5CF_2CF_2O)_{j'}-$, then $R'_f$ is a fluoroalkylene group with 1 to 4 C atoms.

7. A method according to claim 1, wherein the perfluoropolyethers of formula (I) are in aqueous compositions consisting of said perfluoropolyethers and optionally a solvent, and wherein the perfluoropolyethers of formula (I) are used in the form of salts solubilized or emulsified in water or in mixtures of water with alcohols, glycols, or ethers, wherein the alcohols are selected from isopropanol, ethanol, methanol, and t-butanol; the ether is dipropylenglycol monomethylether; and the glycols are selected from ethylene glycol and propylene glycol.

8. The method of claim 1, wherein the paper sized accordingly to the method is conferred sufficient oleorepellance to satisfy satisfies one of more of the following tests: the Ralston Purina Crease Test, Oleic Acid Test, Eukanuba Test, Turpentine Test, and Fat Acid Test.

9. A method for conferring oleorepellence to paper comprising sizing paper using aqueous compositions consisting of:

A) from 15 to 25% by weight of a compound of formula (I), in the form of salts, wherein the salts are obtained by neutralization of acids with bases, and wherein the compound of formula (I) has the following structure:

$$T-O-R_f-T \quad (I)$$

wherein
$T=-CF_2-COOH$ or $-CF_2CF_2-COOH$;
$R_f$ is a (per)fluoropolyoxyalkylene chain, having number average molecular weight in the range 500-10,000, formed of one or more repeating units, statistically distributed along the chain, selected from the group consisting of the following structures:

(CFXO), $(CF_2CF_2O)$, $(CF_2CF_2CF_2O)$, $(CF_2CF_2CF_2CF_2O)$, $(CR_4R_5CF_2CF_2O)$, $(CF(CF_3)CF_2O)$, and $(CF_2CF(CF_3)O)$, wherein $X=F$, $CF_3$; $R_4$ and $R_5$, equal to or different from each other, are selected from the group consisting of H, Cl, and perfluoroalkyl having from 1 to 4 carbon atoms, and optionally B) from 1 to 5% by weight of a solvent selected from the group consisting of alcohols, glycols, and ethers;

C) water as complement to 100%.

10. A method according to claim 9, wherein the composition comprises a solvent selected from the group consisting of isopropanol, ethanol, methanol, t-butanol, dipropylenglycol monomethylether, ethylene glycol, and propylene glycol.

11. The method of claim 9, wherein the compound of formula (I) comprises salt cations selected from the group consisting of alkaline metals, ammonium, and primary, secondary or tertiary amines in protonated form.

12. Oleo-repellent paper obtained by treatment with the aqueous compositions of claim 9, containing from 0.05 to 2% by weight with respect to the dry cellulose of a compound of formula (I)

$$T-O-R_f-T \quad (I)$$

wherein
$T=-CF_2-COOH$ or $-CF_2CF_2-COOH$;
$R_f$ is a (per)fluoropolyoxyalkylene chain, having number average molecular weight in the range 500-10,000, formed of one or more repeating units, statistically distributed along the chain, selected from the group consisting of the following structures:

(CFXO), $(CF_2CF_2O)$, $(CF_2CF_2CF_2O)$, $(CF_2CF_2CF_2CF_2O)$, $(CR_4R_5CF_2CF_2O)$, $(CF(CF_3)CF_2O)$, and $(CF_2CF(CF_3)O)$, wherein $X=F$, $CF_3$; $R_4$ and $R_5$, equal to or different from each other, are selected from the group consisting of H, Cl, or perfluoroalkyl from 1 to 4 carbon atoms, or one of its salts.

* * * * *